US007910882B2

(12) United States Patent
Loboda

(10) Patent No.: US 7,910,882 B2
(45) Date of Patent: Mar. 22, 2011

(54) APPARATUS AND METHOD FOR COOLING IONS

(75) Inventor: Alexandre Loboda, Toronto (CA)

(73) Assignee: DH Technologies Development Pte. Ltd., Concord, Ontario (CA)

( * ) Notice: Subject to any disclaimer, the term of this patent is extended or adjusted under 35 U.S.C. 154(b) by 264 days.

(21) Appl. No.: 12/016,282

(22) Filed: Jan. 18, 2008

(65) Prior Publication Data

US 2008/0203286 A1 Aug. 28, 2008

Related U.S. Application Data

(60) Provisional application No. 60/885,788, filed on Jan. 19, 2007.

(51) Int. Cl.
*B01D 59/44* (2006.01)

(52) U.S. Cl. ......... 250/288; 250/281; 250/282; 250/283

(58) Field of Classification Search ........... 250/281–300
See application file for complete search history.

(56) References Cited

U.S. PATENT DOCUMENTS 3,660,655 A 5/1972 Wardell
3,930,155 A * 12/1975 Kanomata et al. ................ 850/9
4,442,354 A * 4/1984 Hurst et al. .................. 250/281
4,447,724 A * 5/1984 Oechsner .......................... 850/9
4,652,753 A * 3/1987 Shiokawa ..................... 250/281
4,778,993 A * 10/1988 Waugh .......................... 250/287
4,912,327 A 3/1990 Waugh
5,083,020 A 1/1992 Takahashi
5,087,815 A * 2/1992 Schultz et al. .................. 850/63
5,105,082 A * 4/1992 Maruo et al. .................. 250/288
5,376,791 A * 12/1994 Swanson et al. ................ 850/63
5,528,034 A * 6/1996 Yamazaki et al. .............. 850/43
5,763,875 A * 6/1998 Kaesdorf et al. .............. 250/287
5,943,548 A * 8/1999 Kim .................................. 438/7
6,008,491 A * 12/1999 Smentkowski et al. ......... 850/43
6,794,641 B2 * 9/2004 Bateman et al. .............. 250/281
6,833,543 B2 * 12/2004 Krutchinsky et al. ......... 250/281
6,835,928 B2 * 12/2004 Bateman ....................... 250/282
7,071,467 B2 * 7/2006 Bateman et al. .............. 250/292
7,102,126 B2 9/2006 Bateman et al.

(Continued)

OTHER PUBLICATIONS

International Search Report and Written Opinion, PCT/CA2008/000094; mailed on Apr. 17, 2008.

(Continued)

*Primary Examiner* — Robert Kim
*Assistant Examiner* — Michael J Logie
(74) *Attorney, Agent, or Firm* — Bereskin & Parr LLP/S.E.N.C.R.L., s.r.l.

(57) ABSTRACT

An apparatus for secondary ion mass spectrometry is provided having a target surface for supporting a sample on the target surface and an ion source configured to direct a beam of primary ions toward the sample to sputter secondary ions and neutral particles from the sample, A first chamber having an inlet provides gas to maintain high pressure at the sample for cooling the secondary ions and neutral particles, the high pressure being in the range of about $10^{-3}$ to about 1000 Torr. A method of secondary ion mass spectrometry is provided having a target surface for supporting a sample, directing a beam of primary ions toward the sample to sputter secondary ions and neutral particles from the sample, and providing a high pressure at the sample for cooling the secondary ions and neutral particles, the high pressure being in the range of about $10^{-3}$ to about 1000 Torr.

25 Claims, 6 Drawing Sheets

U.S. PATENT DOCUMENTS

| | | | | |
|---|---|---|---|---|
| 7,223,969 | B2 * | 5/2007 | Schultz et al. | 250/290 |
| 7,528,365 | B2 * | 5/2009 | Guo et al. | 250/282 |
| 7,629,576 | B2 * | 12/2009 | Schultz et al. | 250/287 |
| 7,635,841 | B2 * | 12/2009 | Bateman et al. | 250/292 |
| 2003/0008404 | A1 * | 1/2003 | Tomita et al. | 436/72 |
| 2003/0080290 | A1 * | 5/2003 | Baranov et al. | 250/288 |
| 2004/0238754 | A1 * | 12/2004 | Baranov et al. | 250/423 R |
| 2006/0108520 | A1 * | 5/2006 | Park et al. | 250/287 |
| 2006/0138317 | A1 * | 6/2006 | Schultz et al. | 250/287 |
| 2006/0192104 | A1 * | 8/2006 | Schultz et al. | 250/287 |
| 2006/0289746 | A1 * | 12/2006 | Raznikov et al. | 250/294 |
| 2009/0140140 | A1 * | 6/2009 | Raznikov et al. | 250/287 |

OTHER PUBLICATIONS

International Preliminary Report on Patentability, PCT/CA2008/000094; dated Jul. 21, 2009.

* cited by examiner

APPARATUS AND METHOD FOR COOLING IONS

This application claims the benefit under 35 U.S.C. 119(e) of U.S. Provisional Application No. 60/885,788, filed Jan. 19, 2007.

FIELD

The applicant's teachings relate to an apparatus and method for cooling secondary ions in a secondary ion mass spectrometer.

INTRODUCTION

Secondary Ion Mass spectrometry (SIMS) is a surface analysis technique whereby a sample is bombarded with primary ions to sputter secondary ions and neutral particles. The secondary ions typically have high internal excitation leading to fragmentation of ions of interest. The secondary ions need to be stabilized to prevent fragmentation. Also, the primary ions can collide with gas molecules thereby slowing down and scattering rather than bombarding the sample.

SUMMARY

In accordance with an aspect of the applicant's teachings, there is provided an apparatus for performing secondary ion mass spectrometry. The apparatus comprises a target surface for supporting a sample deposited on the target surface and an ion source configured to direct a beam of primary ions toward the sample to sputter secondary ions and neutral particles from the sample, at least a portion of the ion source can be configured to operate in vacuum. The beam of primary ions can be continuous or it can be pulsed. The primary ions can comprise cluster ions, such as $C_{60}$ ions. The apparatus also comprises a first chamber surrounding the target surface and the sample. The first chamber having an inlet for providing a gas to maintain high pressure at the sample for cooling the secondary ions and neutral particles, the high pressure being in the range of about $10^{-3}$ to about 1000 Torr, and preferably at about 10 mTorr. The high pressure can also be in the range of about $10^{-1}$ to about 100 Torr. The gas provided for cooling the secondary ions and neutral particles can be pulsed into the chamber or introduced continuously. The apparatus can further comprise a cooling path for receiving the secondary ions and neutral particles from the sample wherein the secondary ions and neutral particles are cooled along the cooling path. A product obtained by multiplying the high pressure at the sample by a length of the cooling path can be greater than $10^{-3}$ Torr*cm. The neutral particles can be post-ionized, for example, with a laser light, by ion-ion charge transfer, by photo-ionization using VUV light, or by other techniques as known in the art. The inlet into the first chamber can be a conduit for directing gas at the sample. An output end of the ion source can be less than 1 cm from the sample. The output end of the ion source can also be 1 mm or less from the sample. The apparatus can further comprise a skimmer having an aperture, the skimmer being configured to receive and direct the secondary ions, which can include the ions generated by post-ionization of the neutral particles, through the aperture of the skimmer into an RF ion guide. Furthermore, the ion source can be configured to direct the beam of primary ions through the aperture of the skimmer toward the sample to sputter secondary ions and neutral particles from the sample. Also, the ion source can be integral with a portion of the skimmer.

In another aspect, there is provided a method of secondary ion mass spectrometry. The method comprises providing a target surface for supporting a sample deposited on the target surface. The method also comprises directing a beam of primary ions toward the sample to sputter secondary ions and neutral particles from the sample and providing a high pressure at the sample for cooling the secondary ions and neutral particles, the high pressure being in the range of about $10^{-3}$ to about 1000 Torr, and preferably at about 10 mTorr The high pressure can also be in the range of about $10^{-3}$ to about 100 Torr. The beam of primary ions can be continuous or it can be pulsed. The primary ions can comprise cluster ions, such as $C_{60}$ ions. The method further comprising providing gas to maintain the high pressure. The gas can be provided continuously or it can be a pulsed gas. The method further comprising directing the secondary ions and neutral particles sputtered from the sample into a cooling path and subjecting the secondary ions and neutral particles to cooling along the path. A product obtained by multiplying the high pressure at the sample by a length of the cooling path can be greater than $10^{-3}$ Torr*cm. The neutral particles can be post-ionized, for example, with a laser light, by ion-ion charge transfer, by photo-ionization using VUV light, or by other techniques as known in the art. The method can further comprise delivering gas at the sample. The beam of primary ions can be directed at the sample. The method can further comprise providing a skimmer having an aperture and receiving and directing the secondary ions, which can include the ions generated by post-ionization of the neutral particles, through the aperture into an RF ion guide. Furthermore, the ion source can be configured to direct the beam of primary ions through the aperture of the skimmer toward the sample to sputter secondary ions and neutral particles from the sample. Also, the ion source can be integral with a portion of the skimmer.

These and other features of the applicants' teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION OF VARIOUS EMBODIMENTS

Figure 1:
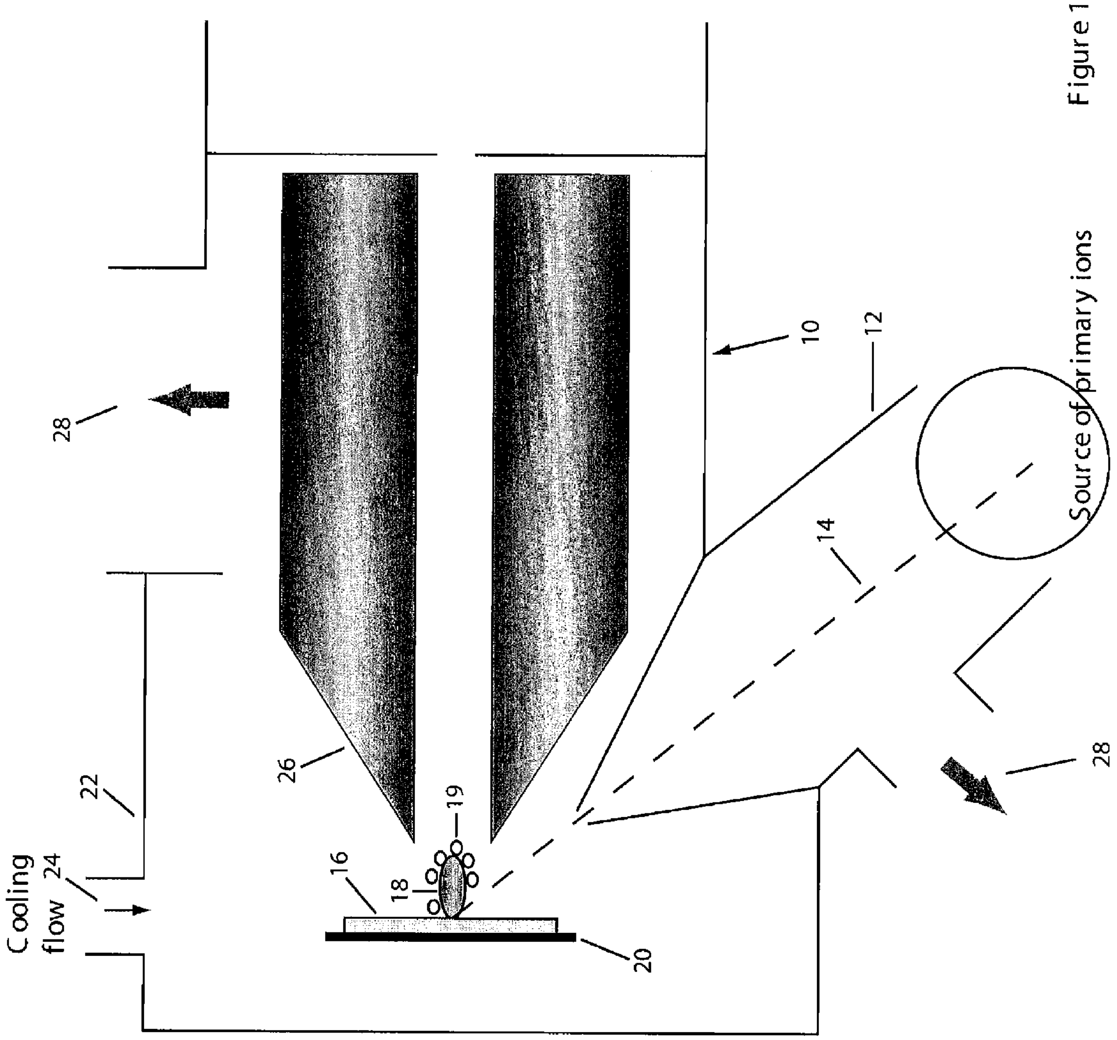
FIG. 1 schematically illustrates a secondary ion mass spectrometry system in accordance with various embodiments of the applicant's teachings.

It should be understood that the phrase "a" or "an" used in conjunction with the applicant's teachings with reference to various elements encompasses "one or more" or "at least one" unless the context clearly indicates otherwise. Referring to FIG. 1, in various embodiments in accordance with the applicant's teachings, a schematic diagram illustrates a secondary ion mass spectrometry system 10 having an ion source 12 configured to direct a beam of primary ions 14 toward a sample 16 to sputter secondary ions 18 and neutral particles 19 from the sample 16. In various embodiments, the beam of primary ions can be continuous or it can be pulsed. The primary ions can comprise cluster ions that can be metal or organic clusters, as known in the art, or any other suitable projectile ions. Projectile ions can comprise different charge states. For example, the primary ions can comprise of $C_{60}$ ions that are stable, robust large molecules that leave no residues when bombarding the sample. At least a portion of the ion source 12 can be configured to operate in vacuum. The sample 16 is supported on a target surface 20. High pressure can be provided at the sample 16 for cooling and stabilizing the secondary ions which can have high internal excitation leading to fragmentation of ions of interest. Rapid cooling of the secondary ions can prevent such fragmentation. High pressure at the sample can facilitate rapid cooling of the secondary ions and the neutral particles. In various aspects, the high pressure can comprise a pressure in the range of about $10^{-3}$ to about 1000 Torr, and preferably at about 10 mTorr. In various aspects, the high pressure can be in the range of about $10^{-1}$ to about 100 Torr. In various embodiments, the neutral particles can be post-ionized as is well known in the art. For example, the neutral particles can be, but are not limited to be, post-ionized with a laser light, by ion-ion charge transfer ionization, or by photo-ionization using VUV light. A chamber 22 can surround the target surface and the sample. In various embodiments, the chamber 22 comprises an inlet 24 providing gas to maintain the high pressure as well as direct and focus the secondary ions, which can include the ions generated by post-ionization of the neutral particles, into an RF ion guide 26. The gas typically can be a non-reactive gas, including, but not limited to, nitrogen, helium, or argon, as well known in the art. In various aspects, the gas can be provided continuously or it can be pulsed. Pumps 28 can regulate the pressure of the ion source 12, which can be from about $10^{-2}$ to about $10^{-10}$ Torr, and the chamber 22. A cooling path can receive the secondary ions and neutral particles from the sample, and the secondary ions and neutral particles can be cooled along the cooling path. At least a portion of the cooling path can lie along an RF ion guide. The secondary ions, which can include the ions generated by post-ionization of the neutral particles, can pass through the RF ion guide 26 into a mass analyzer, including, but not limited to, a quadrupole, time-of-flight, ion trap, or Fourier transform mass spectrometer.

Figure 2:
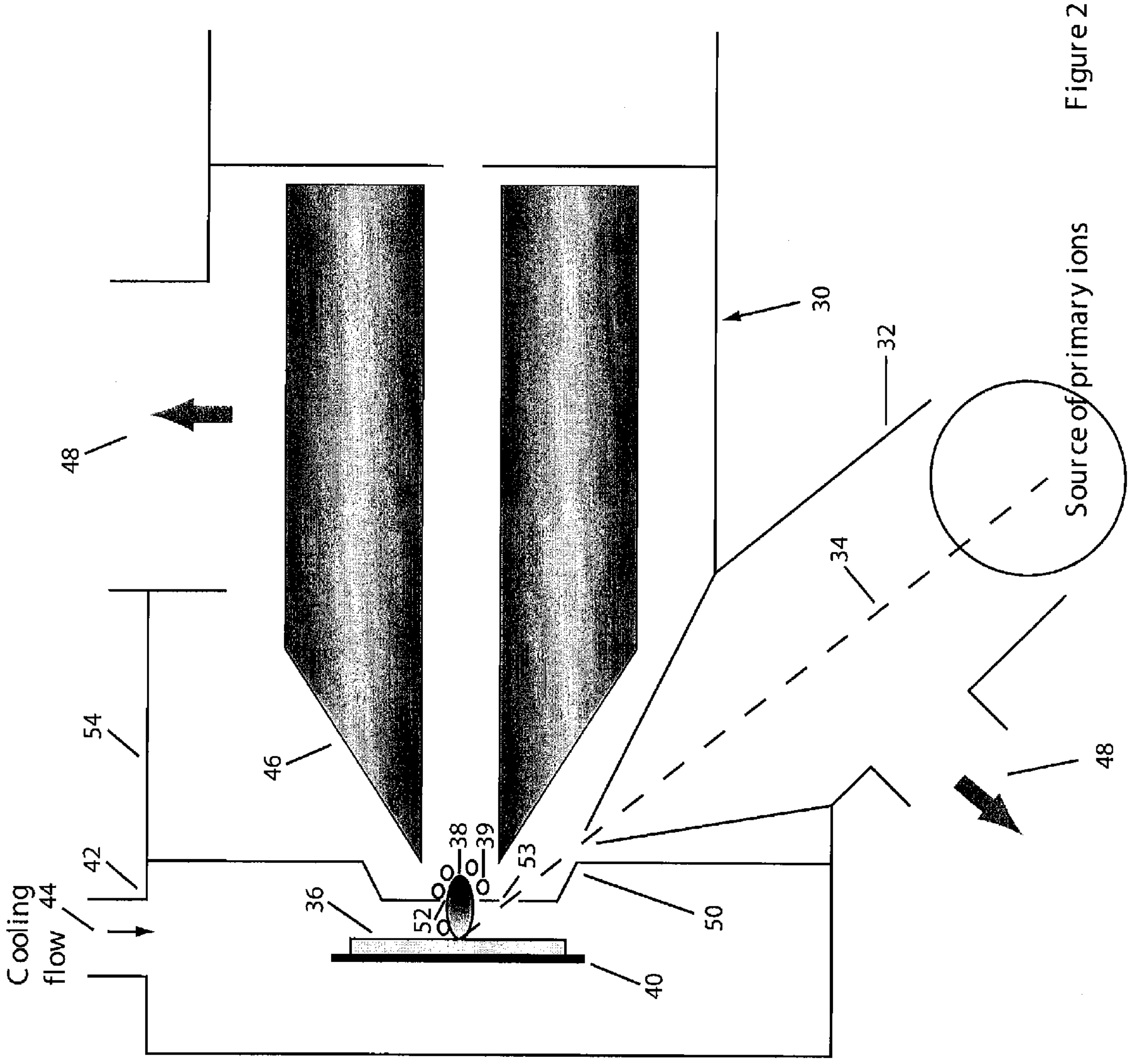
FIG. 2 schematically illustrates a secondary ion mass spectrometry system, including a skimmer having an aperture, in accordance with various embodiments.

As shown in FIG. 2, in various embodiments in accordance with the applicant's teachings, a schematic diagram illustrates a secondary ion mass spectrometry system 30 having an ion source 32 configured to direct a beam of primary ions 34 toward a sample 36 to sputter secondary ions 38 and neutral particles 39 from the sample 36. In various embodiments, the beam of primary ions can be continuous or it can be pulsed. The primary ions can comprise cluster ions that can be metal or organic clusters, as known in the art, or any other suitable projectile ions. Projectile ions can comprise different charge states. For example, the primary ions can comprise of $C_{60}$ ions that are stable, robust large molecules that leave no residues when bombarding the sample. At least a portion of the ion source 32 can be configured to operate in vacuum. The sample 36 is supported on a target surface 40. High pressure can be provided at the sample 36 for cooling and stabilizing the secondary ions which can have high internal excitation leading to fragmentation of ions of interest. Rapid cooling of the secondary ions can prevent such fragmentation. High pressure at the sample can facilitate rapid cooling of the secondary ions and the neutral particles. In various aspects, the high pressure can comprise a pressure in the range of about $10^{-3}$ to about 1000 Torr, and preferably at about 10 mTorr. In various aspects, the high pressure can be in the range of about $10^{-1}$ to about 100 Torr. In various embodiments, the neutral particles can be post-ionized as is well known in the art. For example, the neutral particles can be, but are not limited to be, post-ionized with a laser light, by ion-ion charge transfer ionization, or by photo-ionization using VUV light. A first chamber 42 can surround the target surface and the sample. In various embodiments, the first chamber 42 comprises an inlet 44 providing gas to maintain the high pressure. In various aspects, the system 30 comprises a skimmer 50 having apertures 52 and 53. Primary ions pass into chamber 42 through an opening 53. The gas can direct and focus the secondary ions, which can include the ions generated by post-ionization of the neutral particles, through the aperture 52 of the skimmer 50 into an RF ion guide 46 located in a second chamber 54. In various embodiments, the ion source 32 can be configured to direct the beam of primary ions 34 through the aperture 53 of the skimmer 50 to sputter secondary ions and neutral particles from the sample 36. The pressure of the second chamber 54 can be lower than in the first chamber 42, for example, 10 mTorr. The gas typically can be a non-reactive gas, including, but not limited to, nitrogen, helium, or argon, as well known in the art. In various aspects, the gas can be provided continuously or it can be pulsed. Pumps 48 can regulate the pressure of the ion source 32, which can be $10^{-2}$ to $10^{-10}$ Torr, and the second chamber 54. A cooling path can receive the secondary ions and neutral particles from the sample, and the secondary ions and neutral particles can be cooled along the cooling path. At least a portion of the cooling path can lie along an RF ion guide. The secondary ions, which can include the ions generated by post-ionization of the neutral particles, can pass through the RF ion guide 46 into a mass analyzer, including, but not limited to, a quadrupole, time-of-flight, ion trap, or Fourier transform mass spectrometer.

Figure 3:
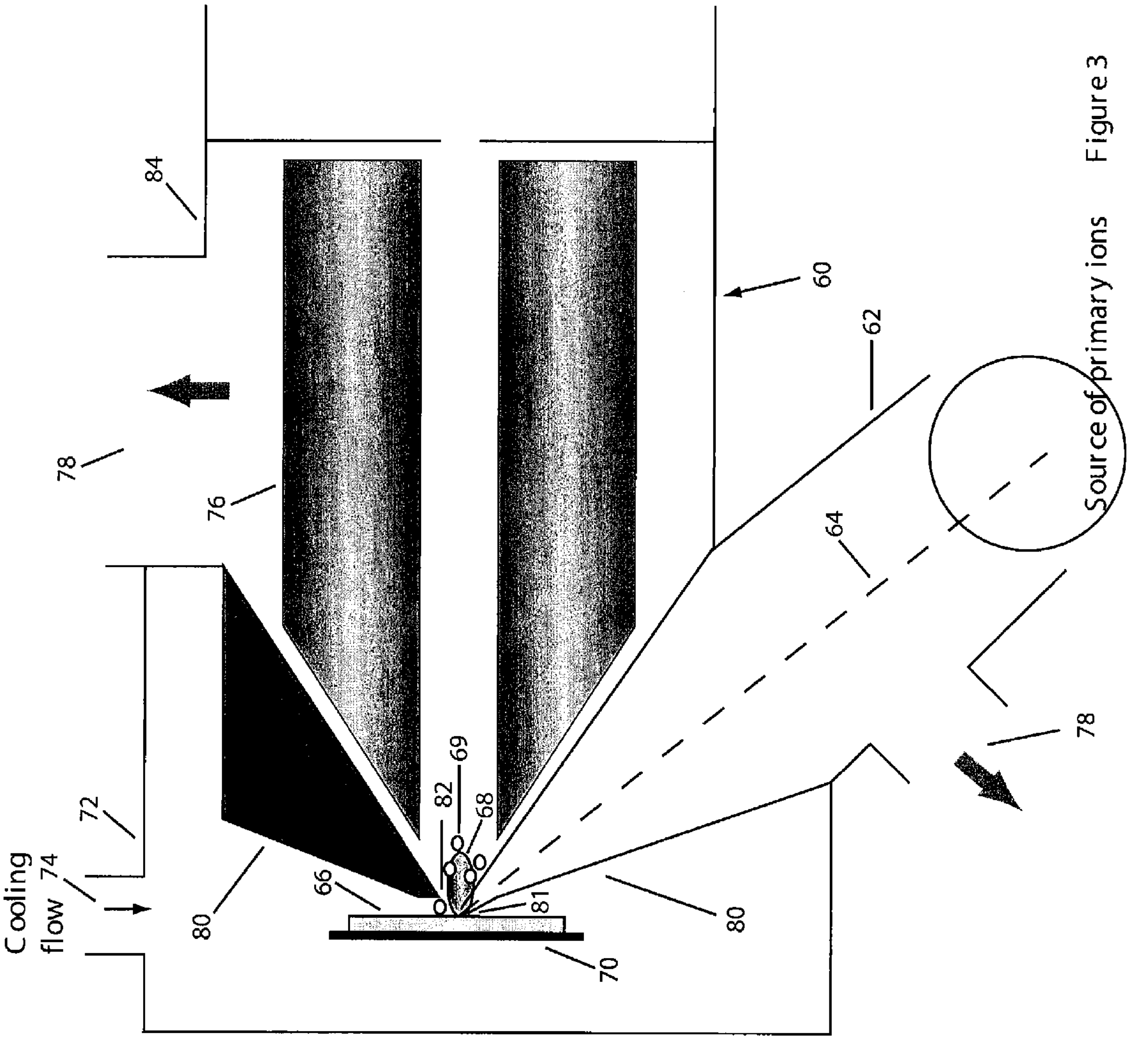
FIG. 3 schematically illustrates a secondary ion mass spectrometry system, including an ion source integral with a portion of the skimmer, in accordance with various embodiments.

Referring to FIG. 3, in various embodiments in accordance with the applicant's teachings, a schematic diagram illustrates a secondary ion mass spectrometry system 60 having an ion source 62 configured to direct a beam of primary ions 64 toward a sample 66 to sputter secondary ions 68 and neutral particles 69 from the sample 66. In various embodiments, the beam of primary ions can be continuous or it can be pulsed. The primary ions can comprise cluster ions that can be metal or organic clusters, as known in the art, or any other suitable projectile ions. Projectile ions can comprise different charge states. For example, the primary ions can comprise of $C_{60}$ ions that are stable, robust large molecules that leave no residues when bombarding the sample. At least a portion of the ion source 62 can be configured to operate in vacuum. The sample 66 is supported on a target surface 70. High pressure can be provided at the sample 66 for cooling and stabilizing the secondary ions which can have high internal excitation leading to fragmentation of ions of interest. Rapid cooling of the secondary ions can prevent such fragmentation. High pressure at the sample can facilitate rapid cooling of the secondary ions and neutral particles. In various aspects, the high pressure can comprise a pressure in the range of about $10^{-3}$ to about 1000 Torr, and preferably at about 10 mTorr. In various aspects, the high pressure can be in the range of about $10^{-1}$ to about 100 Torr. In various embodiments, the neutral particles can be post-ionized as is well known in the art. For example, the neutral particles can be, but are not limited to be, post-ionized with a laser, by ion-ion charge transfer ionization, or by photo-ionization using VUV light. A first chamber 72 can surround the target surface and the sample. In various embodiments, the first chamber 72 comprises an inlet 74 providing gas to maintain the high pressure. In various aspects, the system 60 comprises a skimmer 80 having an aperture 82. In various embodiments, the ion source 62 can be integral with a portion of the skimmer 80. The output end 81 of the ion source 62 can be located in close proximity to the sample 66. Such an arrangement can alleviate the undesired consequences of the primary ions colliding with the gas, slowing down, scattering and breaking down, thereby affecting the trajectory of the primary ions toward the sample and efficiency of generation of secondary ions. The gas can direct and focus the secondary ions, which can include ions generated by post-ionization of the neutral particles, through the aperture 82 of the skimmer 80 into an RF ion guide 76 located in a second chamber 84. The pressure of the second chamber 84 can be lower than in the first chamber 72, for example, 10 mTorr. The gas typically can be a non-reactive gas, including, but not limited to, nitrogen, helium, or argon, as well known in the art. In various aspects, the gas can be provided continuously or it can be pulsed. Pumps 78 can regulate the pressure of the ion source 62, which can be $10^{-2}$ to $10^{-10}$ Torr, and the second chamber 84. A cooling path can receive the secondary ions and neutral particles from the sample, and the secondary ions and neutral particles can be cooled along the cooling path. At least a portion of the cooling path can lie along an RF ion guide. The secondary ions, which can include the ions generated by post-ionization of the neutral particles, can pass through the RF ion guide 76 into a mass analyzer, including, but not limited to, a quadrupole, time-of-flight, ion trap, or Fourier transform mass spectrometer.

Figure 4:
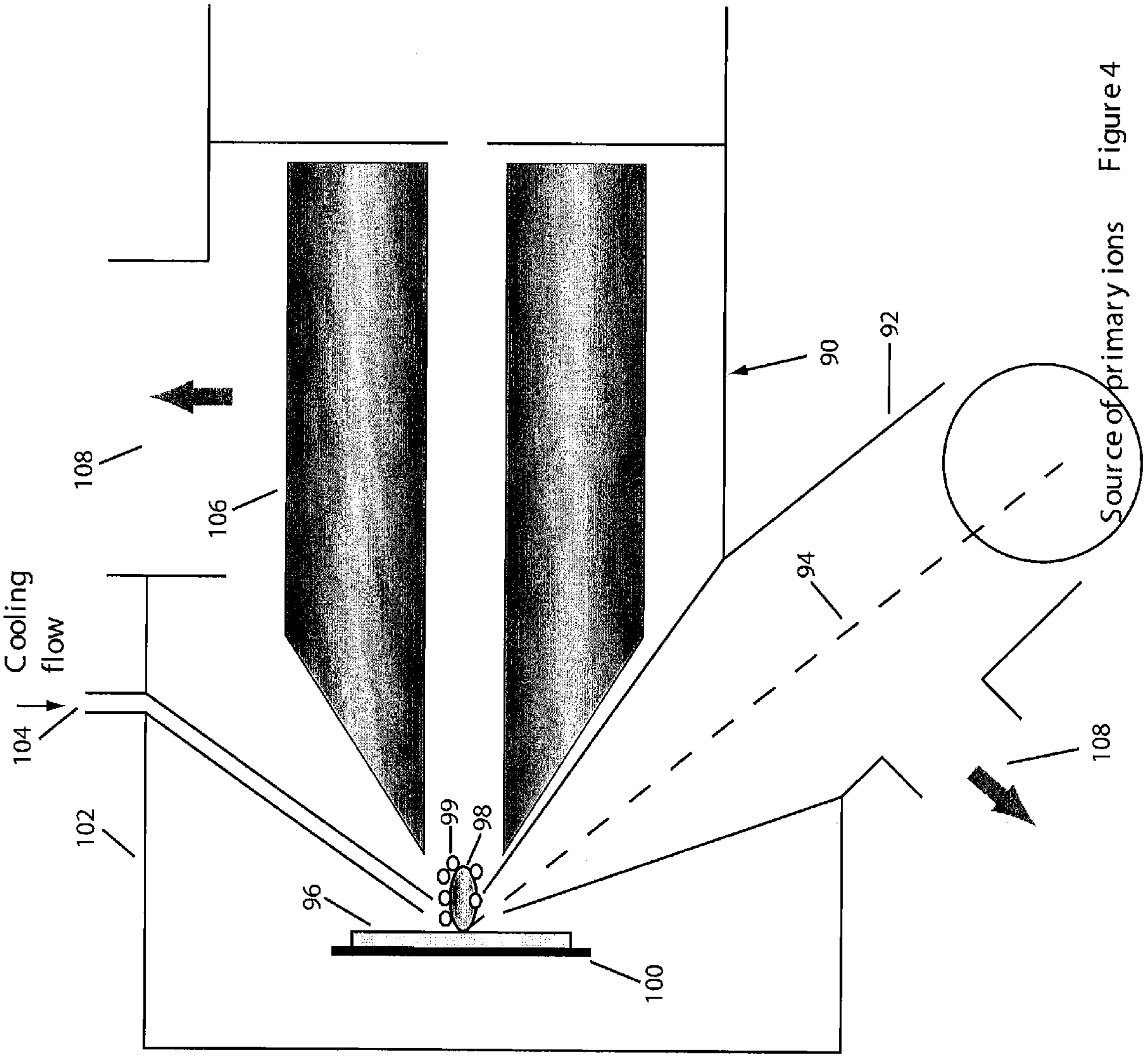
FIG. 4 schematically illustrates a secondary ion mass spectrometer system, including a chamber having an inlet that is a conduit delivering gas at the sample, in accordance with various embodiments.

Referring to FIG. 4, in various embodiments in accordance with the applicant's teachings, a schematic diagram illustrates a secondary ion mass spectrometry system 90 having an ion source 92 configured to direct a beam of primary ions 94 toward a sample 96 to sputter secondary ions 98 and neutral particles 99 from the sample 96. In various embodiments, the beam of primary ions can be continuous or it can be pulsed. The primary ions can comprise cluster ions that can be metal or organic clusters, as known in the art, or any other suitable projectile ions. Projectile ions can comprise different charge states. For example, the primary ions can comprise of $C_{60}$ ions that are stable, robust large molecules that leave no residues when bombarding the sample. At least a portion of the ion source 92 can be configured to operate in vacuum. The sample 96 is supported on a target surface 100. High pressure can be provided at the sample 96 for cooling and stabilizing the secondary ions which can have high internal excitation leading to fragmentation of ions of interest. Rapid cooling of the secondary ions can prevent such fragmentation. High pressure at the sample can facilitate rapid cooling of the secondary ions and neutral particles. In various aspects, the high pressure can comprise a pressure in the range of about $10^{-3}$ to about 1000 Torr, and preferably at about 10 mTorr. In various aspects, the high pressure can be in the range of about $10^{-1}$ to about 100 Torr. In various embodiments, the neutral particles can be post-ionized as is well known in the art. For example, the neutral particles can be, but are not limited to be, post-ionized with a laser, by ion-ion charge transfer ionization, or by photo-ionization using VUV light. A chamber 102 can surround the target surface and the sample. In various embodiments, the chamber 102 comprises a conduit 104 providing gas to maintain the high pressure as well as direct and focus the secondary ions, which can include ions generated by post-ionization of the neutral particles, into an RF ion guide 106. The conduit 104 can deliver the gas at the sample to facilitate rapid cooling of the secondary ions and neutral particles. The gas typically can be a non-reactive gas, including, but not limited to, nitrogen, helium, or argon, as well known in the art. In various aspects, the gas can be provided continuously or it can be pulsed. Pumps 108 can regulate the pressure of the ion source 92, which can be from about $10^{-2}$ to about $10^{-10}$ Torr, and the chamber 102. A cooling path can receive the secondary ions and neutral particles from the sample, and the secondary ions and neutral particles can be cooled along the cooling path. At least a portion of the cooling path can lie along an RF ion guide. The secondary ions, which can include ions generated by post-ionization of the neutral particles, can pass through the RF ion guide 106 into a mass analyzer, including, but not limited to, a quadrupole, time-of-flight, ion trap, or Fourier transform mass spectrometer.

Figure 5:
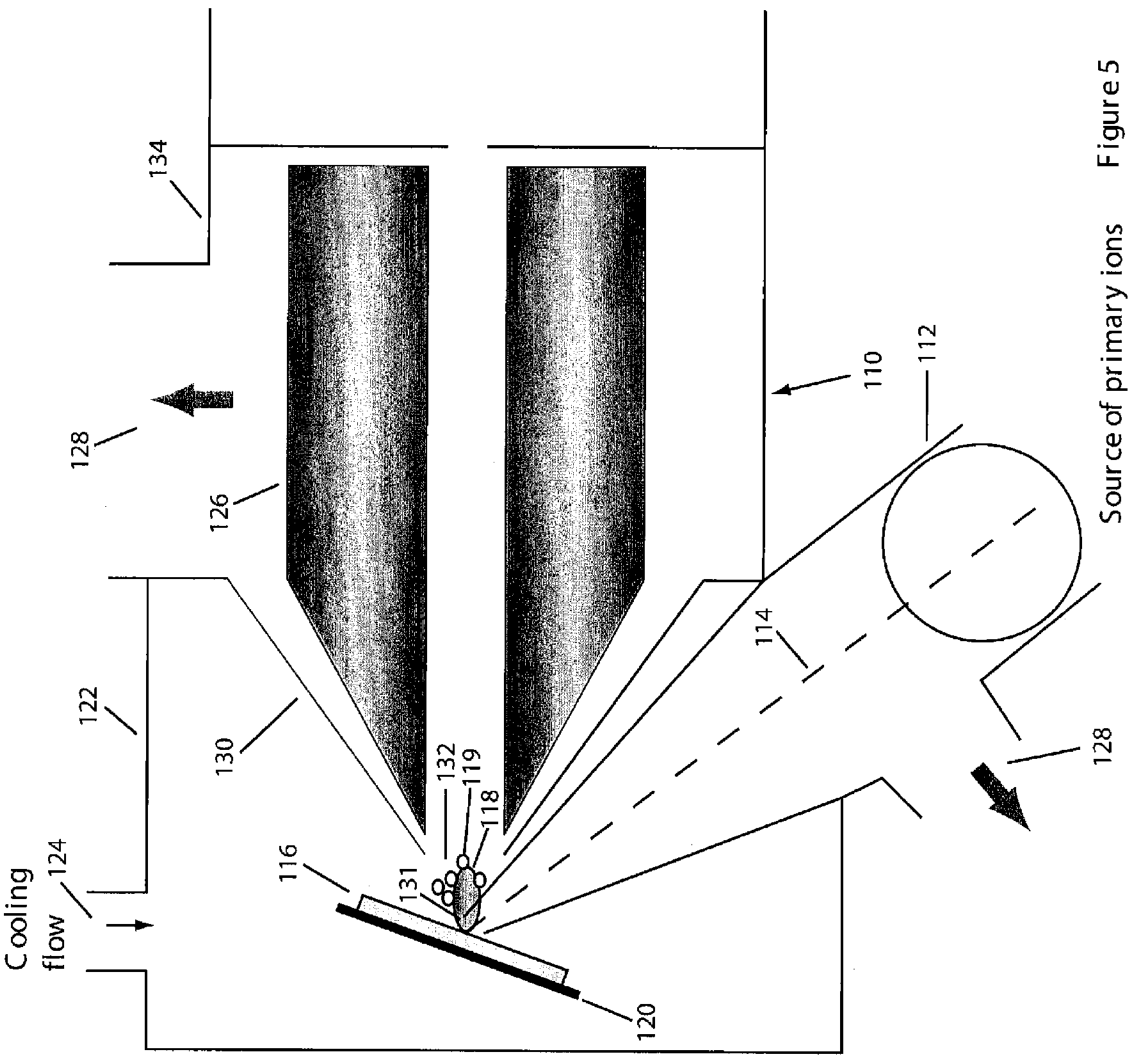
FIG. 5 schematically illustrates a secondary ion mass spectrometer system, including an output end of the ion source located in close proximity to the sample, in accordance with various embodiments.

Referring to FIG. 5, in various embodiments in accordance with the applicant's teachings, a schematic diagram illustrates a secondary ion mass spectrometry system 110 having an ion source 112 configured to direct a beam of primary ions 114 toward a sample 116 to sputter secondary ions 118 and neutral particles 119 from the sample 116. In various embodiments, the beam of primary ions can be continuous or it can be pulsed. The primary ions can comprise cluster ions that can be metal or organic clusters, as known in the art, or any other suitable projectile ions. Projectile ions can comprise different charge states. For example, the primary ions can comprise of $C_{60}$ ions that are stable, robust large molecules that leave no residues when bombarding the sample. At least a portion of the ion source 112 can be configured to operate in vacuum. The sample 116 is supported on a target surface 120. High pressure can be provided at the sample 116 for cooling and stabilizing the secondary ions which can have high internal excitation leading to fragmentation of ions of interest. Rapid cooling of the secondary ions can prevent such fragmentation. High pressure at the sample can facilitate rapid cooling of the secondary ions and neutral particles. In various aspects, the high pressure can comprise a pressure in the range of about $10^{-3}$ to about 1000 Torr, and preferably at about 10 mTorr. In various aspects, the high pressure can be in the range of about $10^{-1}$ to about 100 Torr. In various embodiments, the neutral particles can be post-ionized as is well known in the art. For example, the neutral particles can be, but are not limited to be, post-ionized with a laser, by ion-ion charge transfer ionization, or by photo-ionization using VUV light. A first chamber 122 can surround the target surface and the sample. In various embodiments, the first chamber 122 comprises an inlet 124 providing gas to maintain the high pressure. In various aspects, the system 110 comprises a skimmer 130 having an aperture 132. In various embodiments, the output end 131 of the ion source 112 can be located in close proximity to the sample 116. In various embodiments, the output end 131 of the ion source 112 can be, but is not limited to, less than 1 cm from the sample. In various embodiments, the output end 131 of the ion source 112 can be, but is not limited to, 1 mm or less from the sample. In various aspects, depending on the configuration of the system, the output end of the ion source can be located as close as possible to the sample without touching the sample. Such arrangements can alleviate the undesired consequences of the primary ions colliding with the gas, slowing down, scattering, and fragmenting thereby affecting the trajectory of the primary ions toward the sample and the yield of secondary ions. The gas can direct and focus the secondary ions, which can include the ions generated by post-ionization of the neutral particles, through the aperture 132 of the skimmer 130 into an RF ion guide 126 located in a second chamber 134. The pressure of the second chamber 134 can be lower than in the first chamber 122, for example, 10 mTorr. The gas typically can be a non-reactive gas, including, but not limited to, nitrogen, helium, or argon, as well known in the art. In various aspects, the gas can be provided continuously or it can be pulsed. Pumps 128 can regulate the pressure of the ion source 62, which can be $10^{-2}$ to $10^{-10}$ Torr, and the second chamber 134. A cooling path can receive the secondary ions and neutral particles from the sample, and the secondary ions and neutral particles can be cooled along the cooling path. At least a portion of the cooling path can lie along an RF ion guide. The secondary ions, which can include the ions generated by post-ionization of the neutral particles, can pass through the RF ion guide 126 into a mass analyzer, including, but not limited to, a quadrupole, time-of-flight, ion trap, or Fourier transform mass spectrometer.

Figure 6:
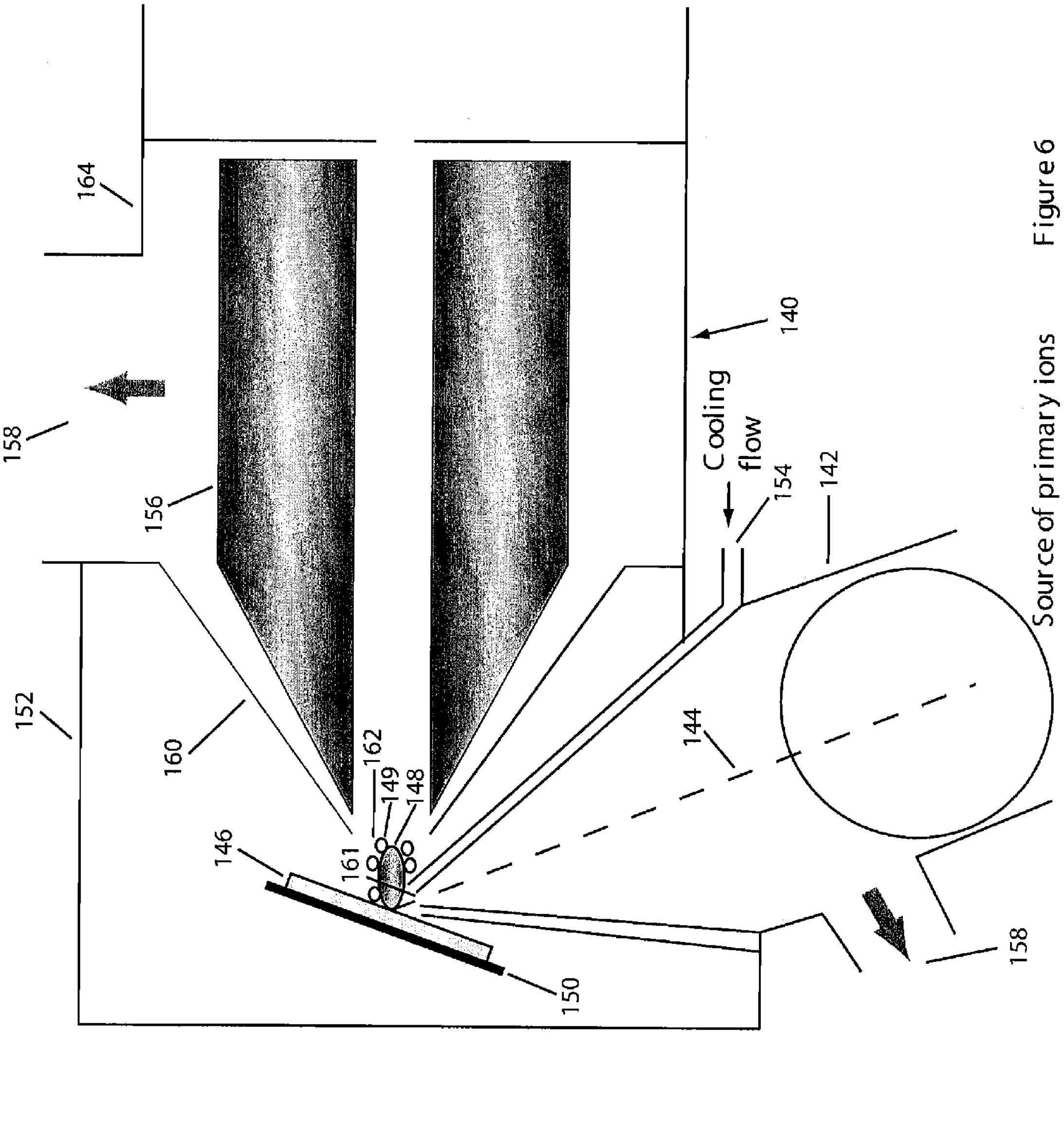
FIG. 6 schematically illustrates a secondary ion mass spectrometry system, including a conduit delivering gas at the sample and an output end of the ion source located in close proximity to the sample.

Referring to FIG. 6, in various embodiments in accordance with the applicant's teachings, a schematic diagram illustrates a secondary ion mass spectrometry system 140 having an ion source 142 configured to direct a beam of primary ions 144 toward a sample 146 to sputter secondary ions 148 and neutral particles 149 from the sample 146. In various embodiments, the beam of primary ions can be continuous or it can be pulsed. The primary ions can comprise cluster ions that can be metal or organic clusters, as known in the art, or any other suitable projectile ions. Projectile ions can comprise different charge states. For example, the primary ions can comprise of $C_{60}$ ions that are stable, robust large molecules that leave no residues when bombarding the sample. At least a portion of the ion source 142 can be configured to operate in vacuum. The sample 146 is supported on a target surface 150. High pressure can be provided at the sample 146 for cooling and stabilizing the secondary ions which can have high internal excitation leading to fragmentation of ions of interest. Rapid cooling of the secondary ions can prevent such fragmentation. High pressure at the sample can facilitate rapid cooling of the secondary ions and neutral particles. In various aspects, the high pressure can comprise a pressure in the range of about $10^{-3}$ to about 1000 Torr, and preferably at about 10 mTorr. In various aspects, the high pressure can be in the range of about $10^{-1}$ to about 100 Torr. In various embodiments, the neutral particles can be post-ionized as is well known in the art. For example, the neutral particles can be, but are not limited to be, post-ionized with a laser, by ion-ion charge transfer ionization, or by photo-ionization using VUV light. A first chamber 152 can surround the target surface and the sample. In various embodiments, the first chamber 152 comprises a conduit 154 providing gas to maintain the high pressure as well as direct and focus the secondary ions, which can include ions generated by post-ionization of the neutral particles, into an RF ion guide 156. The conduit 154 can be located near the ion source 142, and the conduit 154 can deliver the gas at the sample to facilitate rapid cooling of the secondary ions and neutral particles. In various aspects, the system 140 comprises a skimmer 160 having an aperture 162. In various embodiments, the output end 161 of the ion source 142 can be located in close proximity to the sample 146. In various embodiments, the output end 161 of the ion source 142 can be, but is not limited to, less than 1 cm from the sample. In various embodiments, the output end 161 of the ion source 142 can be, but is not limited to, 1 mm or less from the sample. In various aspects, depending on the configuration of the system, the output end of the ion source can be located as close as possible to the sample without touching the sample. Such arrangements can alleviate the undesired consequences of the primary ions colliding with the gas, slowing down, scattering and fragmenting, thereby affecting the trajectory of the primary ions toward the sample and the yield of secondary ions. The gas can direct and focus the secondary ions, which can include ions generated by post-ionization of the neutral particles, through the aperture 162 of the skimmer 160 into an RF ion guide 156 located in a second chamber 164. The pressure of the second chamber 164 can be lower than in the first chamber 152, for example, 10 mTorr. The gas typically can be a non-reactive gas, including, but not limited to, nitrogen, helium, or argon, as well known in the art. In various aspects, the gas can be provided continuously or it can be pulsed. Pumps 158 can regulate the pressure of the ion source 142, which can be $10^{-2}$ to $10^{-10}$ Torr, and the second chamber 164. A cooling path can receive the secondary ions and neutral particles from the sample, and the secondary ions and neutral particles can be cooled along the cooling path. At least a portion of the cooling path can lie along an RF ion guide. The secondary ions, which can include the ions generated by post-ionization of the neutral particles, can pass through the RF ion guide 156 into a mass analyzer, including, but not limited to, a quadrupole, time-of-flight, ion trap, or Fourier transform mass spectrometer.

The embodiments shown in FIGS. 1 to 6 are interfaced to an ion guide, which may not be necessary. Various embodiments may not require an ion guide.

The following describes a general use of the applicant's teachings which is not limited to any particular embodiment, but can be applied to any embodiment. In operation, an ion source, which can be configured to operate in vacuum, bombards a sample, deposited on a target surface, with a beam of primary ions which sputters secondary ions and neutral particles from the sample. In various aspects, the beam of primary ions can be continuous or it can be pulsed. The ion source typically operates from about $10^{-2}$ to about $10^{-10}$ Torr. Since the secondary ions typically can have high internal excitation, which can lead to fragmentation of ions of interest, the secondary ions can be stabilized by providing high pressure at the sample to facilitate rapid cooling of the secondary ions and neutral particles. The high pressure can comprise a pressure in the range of about $10^{-3}$ to about 1000 Torr, and preferably at about 10 mTorr. In various aspects, the high pressure can comprise a pressure in the range of about $10^{-1}$ to about 100 Torr. In various embodiments, the neutral particles can be post-ionized as is well known in the art. For example, the neutral particles can be, but are not limited to be, post-ionized with a laser, by ion-ion charge transfer ionization, or by photo-ionization using VUV light. A first chamber can surround the target surface and the sample. The high pressure can be provided by delivering gas through an inlet in the first chamber. The gas can be delivered at the sample through a conduit in the first chamber. In various aspects, the gas can be provided continuously or it can be pulsed. The output end of the ion source can be in close proximity to the sample which can prevent the primary ions from colliding with the gas, slowing down, scattering, and fragmenting. In various embodiments, the output end of the ion source can be, but is not limited to, less than 1 cm from the sample. In various embodiments, the output end of the ion source can be, but is not limited to, 1 mm or less from the sample. In various aspects, depending on the configuration of the system, the output end of the ion source can be located as close as possible to the sample without touching the sample. A cooling path can receive the secondary ions and neutral particles from the sample, and the secondary ions and neutral particles can be cooled along the cooling path. At least a portion of the cooling path can lie along an RF ion guide. The gas can assist in directing and focusing the secondary ions, which can include ions generated by post-ionization of the neutral particles, into the RF ion guide. In various embodiments, an ion guide may not be required. A skimmer having an aperture can also be used to receive and direct the secondary ions, which can include ions generated by post-ionization of the neutral particles, through the aperture of the skimmer into the RF ion guide, which can be in a second chamber at a lower pressure than the first chamber, for example, 10 mTorr. The ion source can be integral with a portion of the skimmer. The ion source can be configured to direct the beam of primary ions through the aperture of the skimmer toward the sample to sputter secondary ions and neutral particles from the sample. In various aspects, the beam of primary ions can be continuous or it can be pulsed. The secondary ions, which can include ions generated by post-ionization of the neutral particles, can pass through the RF ion guide and can be mass analyzed. The RF ion guide can provide additional benefits, as described in U.S. Pat. No. 4,963,736 by Douglas and French, by focusing the ions.

Collisional cooling of secondary ions with the gas can be efficient if more than one collision occurs. Also, the secondary ion mass spectrometry process can be more efficient or better controlled if the primary ions do not collide with the gas and therefore do not fragment before they bombard the sample. Though, a small number of collisions may still be tolerated. The following equation can define the probability of the number of collisions:

$$N = \sigma \int_0^L n(x)\,dx \qquad \text{(Equation 1)}$$

where N is the expected average number of collisions, σ is the collision cross-section, n(x) is the density of the gas molecules, x is the coordinate along the trajectory, and L is the length of the trajectory.

In a simplified form, this requirement can be stated as pressure of the gas, the high pressure at the sample, in the first chamber times the length of the trajectory of the secondary ions from the target surface to downstream of the sampling region, from the target surface 40 to aperture 52 of the skimmer, the length of the cooling path, equals $10^{-3}$ Torr*cm (Pressure*Length=$10^{-3}$ Torr*cm). This represents a lower border for collisional cooling to have any effect. The gas can be provided such that the product of the gas pressure, the high pressure at the sample, in the first chamber and length of the trajectory of the secondary ions from the target surface to downstream of the sampling region, the length of the cooling path, is greater than $10^{-3}$ Torr*cm. It should be noted that this is an estimate since the pressure in most embodiments is not constant. Equation 1 can be used to obtain a more precise estimate of the number of collisions. The cooling can continue beyond the aperture 52, depending on the pressure of chamber 54.

While the applicant's teachings are described in conjunction with various embodiments, it is not intended that the applicant's teachings be limited to such embodiments. On the contrary, the applicant's teachings encompass various alternatives, modifications, and equivalents, as will be appreciated by those skilled in the art.

In various embodiments, primary ions can be, but are not limited to, cluster ions that can be metal or organic clusters. The primary ions can be $C_{60}$, glycerol, water, gold, or elemental atomic ions.

In various embodiments, the gas typically can be a non-reactive gas, and can be, but is not limited to, nitrogen, argon, or helium. In various embodiments, the gas can be provided continuously or it can be pulsed.

In various embodiments, an ion guide can be, but is not limited to, a multipole. For example, an ion guide can be a quadrupole, a hexapole, or an octapole. An ion guide can be an RF ring guide or any RF guide in which RF fields are used to confine or focus ions radially to prevent radial escape of the ions. An ion guide can be, but is not limited to, a 2D trap, also known as a linear ion trap, or a collision cell.

In various embodiments, the mass analyzer can be, but is not limited to, a quadrupole mass spectrometer, a time-of-flight mass spectrometer, a fourier transform mass spectrometer, a linear ion trap, 3-D ion trap, or an orbitrap mass spectrometer.

All such modifications or variations are believed to be within the sphere and scope of the applicant's teachings as defined by the claims appended hereto.

The invention claimed is:

1. An apparatus for performing secondary ion mass spectrometry, comprising:

a). a target surface for supporting a sample deposited on the target surface;

b). an ion source configured to direct a beam of primary ions toward the sample to sputter secondary ions and neutral particles from the sample, at least a portion of the ion source being configured to operate in vacuum;

c). a first chamber, surrounding the target surface and the sample, the first chamber having an inlet for providing a gas to maintain high pressure at the sample for cooling the secondary ions and neutral particles, the high pressure being in the range of about $10^{-3}$ to about 1000 Torr; and d). an ion guide for receiving and further cooling the secondary ions and the neutral particles, the pressure at the sample being at least equal to or higher than the pressure of the ion guide.

2. The apparatus of claim 1 wherein at least a portion of a cooling path lies along the ion guide.

3. The apparatus of claim 2 wherein a product obtained by multiplying the high pressure at the sample by a length of the cooling path is greater than $10^{-3}$ Torr*cm.

4. The apparatus of claim 1 wherein the neutral particles are post-ionized.

5. The apparatus of claim 1 wherein the inlet into the first chamber is a conduit for directing gas at the sample.

6. The apparatus of claim 1 wherein the gas is pulsed.

7. The apparatus of claim 1 wherein the high pressure is about 10 mTorr.

8. The apparatus of claim 1 wherein an output end of the ion source is less than 1 cm from the sample.

9. The apparatus of claim 1 wherein the beam of primary ions comprises cluster ions.

10. The apparatus of claim 1 further comprising a skimmer having an aperture, the skimmer being configured to receive and direct the secondary ions through the aperture of the skimmer into the ion guide.

11. The apparatus of claim 10 wherein the ion source is configured to direct the beam of primary ions through the aperture of the skimmer toward the sample to sputter secondary ions and neutral particles from the sample.

12. The apparatus of claim 10 wherein the ion source is integral with a portion of the skimmer.

13. A method of secondary ion mass spectrometry, comprising:

a) providing a target surface for supporting a sample deposited on the target surface;

b) directing a beam of primary ions toward the sample to sputter secondary ions and neutral particles from the sample;

c) providing a high pressure at the sample for cooling the secondary ions and neutral particles, the high pressure being in the range of about $10^{-3}$ to about 1000 Torr and;

d) providing an ion guide for receiving and further cooling the secondary ions and the neutral particles, the pressure at the sample being at least equal to or higher than the pressure of the ion guide.

14. The method of claim 13 wherein step c) comprises providing gas to maintain the high pressure.

15. The method of claim 14 wherein the gas is pulsed.

16. The method of claim 13 wherein the high pressure is about 10 mTorr.

17. The method of claim 13 wherein at least a portion of a cooling path lies along the ion guide.

18. The method of claim 17 wherein a product obtained by multiplying the high pressure at the sample by a length of the cooling path trajectory of secondary ions is greater than $10^{-3}$ Torr*cm.

19. The method of claim 13 further comprising post-ionizing the neutral particles.

20. The method of claim 13 wherein step c) comprises delivering gas at the sample.

21. The method of claim 13 wherein in step b) the output of the beam is less than 1 cm from the sample.

22. The method of claim 13 wherein the beam of primary ions comprises cluster ions.

23. The method of claim 13 further comprising:

providing a skimmer having an aperture; and receiving and directing the secondary ions through the aperture the RF ion guide.

24. The method of claim 23 further comprising configuring the ion source to direct the beam of primary ions through the aperture of the skimmer toward the sample to sputter the secondary ions and neutral particles from the sample.

25. The method of claim 23 wherein the ion source is integral with a portion of the skimmer.

* * * * *